US012699640B2

(12) United States Patent
Hamdi

(10) Patent No.: US 12,699,640 B2
(45) Date of Patent: Aug. 4, 2026

(54) SYSTEMS AND METHODS FOR ASSESSING OPERATIONAL STATES OF A COMPUTER ENVIRONMENT

(71) Applicant: Acentium Inc., Boston, MA (US)

(72) Inventor: Amine Hamdi, Boston, MA (US)

(73) Assignee: Acentium Inc., Boston, MA (US)

( * ) Notice: Subject to any disclaimer, the term of this patent is extended or adjusted under 35 U.S.C. 154(b) by 1044 days.

(21) Appl. No.: 17/492,339

(22) Filed: Oct. 1, 2021

(65) Prior Publication Data

US 2022/0107876 A1 Apr. 7, 2022

Related U.S. Application Data

(60) Provisional application No. 63/086,884, filed on Oct. 2, 2020.

(51) Int. Cl.
*G06F 11/34* (2006.01)
*G06F 9/50* (2006.01)
*G06F 11/07* (2006.01)
*G06F 11/30* (2006.01)

(52) U.S. Cl.
CPC ........ *G06F 11/3457* (2013.01); *G06F 9/5077* (2013.01); *G06F 11/0706* (2013.01); *G06F 11/0754* (2013.01); *G06F 11/0793* (2013.01); *G06F 11/3055* (2013.01)

(58) Field of Classification Search
CPC .............. G06F 11/3457; G06F 9/5077; G06F 11/0706; G06F 11/0754; G06F 11/3055; G06F 11/0793
See application file for complete search history.

(56) References Cited

U.S. PATENT DOCUMENTS

| | | | |
|---|---|---|---|
| 10,684,940 B1 | 6/2020 | Kayal et al. | |
| 2002/0059054 A1* | 5/2002 | Bade ........................ | G06F 30/33 |
| | | | 703/20 |
| 2016/0350173 A1* | 12/2016 | Ahad ...................... | H04L 67/02 |
| 2018/0270676 A1* | 9/2018 | Guven ................... | H04W 24/06 |
| 2018/0293511 A1* | 10/2018 | Bouillet ................. | H04L 67/12 |

(Continued)

OTHER PUBLICATIONS

International Search Report and the Written Opinion on PCT Appl. Ser. No. PCT/US2021/053214 dated Jan. 25, 2022 (16 pages).

(Continued)

*Primary Examiner* — Emerson C Puente
*Assistant Examiner* — Yi Hao
(74) *Attorney, Agent, or Firm* — Foley & Lardner LLP

(57) ABSTRACT

Systems and methods for threat response in computer environments can include detecting, by one or more processors, using performance data of a computer environment, an event that occurred and that is indicative of abnormal performance of the computer environment. The one or more processors can identify, among a plurality of assets of the computer environment, a subset of assets associated with the event, and determine from a predefined set of resolutions a plurality of resolutions executable to address a cause of the event. The one or more processors can execute, for each resolution of the plurality of resolutions, a trained model to simulate the resolution for the subset of assets, and select, based at least on results of simulation of each resolution, a resolution among the plurality of resolutions to be implemented.

20 Claims, 8 Drawing Sheets

(56) References Cited

U.S. PATENT DOCUMENTS

| | | | | |
|---|---|---|---|---|
| 2018/0349797 | A1* | 12/2018 | Garvey | ..................... G06F 9/46 |
| 2019/0147371 | A1* | 5/2019 | Deo | ....................... G06N 20/20 |
| | | | | 706/12 |
| 2019/0228296 | A1 | 7/2019 | Gefen et al. | |
| 2021/0264025 | A1* | 8/2021 | Givental | ............. G06N 3/0464 |

OTHER PUBLICATIONS

International Preliminary Report on Patentability on PCT Appl. Ser. No. PCT/US2021/053214 dated Apr. 13, 2023 (9 pages).

* cited by examiner

400

Detect an event indicative of an abnormal performance of a computer environment  402

Identify a subset of assets associated with the detected event  404 a plurality of resolutions for the detected event  406

Execute, for each resolution, a trained model to simulate the resolution  408

Select a first remedial scenario for implementing in the computer ecosystem  410

SYSTEMS AND METHODS FOR ASSESSING OPERATIONAL STATES OF A COMPUTER ENVIRONMENT

CROSS REFERENCE TO RELATED APPLICATIONS

This application claims priority to, and the benefit of, U.S. Provisional Application No. 63/086,884 filed on Oct. 2, 2020, and entitled "SYSTEMS AND METHODS FOR ASSESSING OPERATIONAL STATES OF A COMPUTER ENVIRONMENT," which is incorporated herein by reference in its entirety.

FIELD OF THE DISCLOSURE

The present application relates generally to systems and methods for assessing operational states of assets in a computer environment. Specifically, the present application relates to systems and methods for detecting, based on past recorded data, a past event related to the operation or performance of one or more assets in the computer environment, and simulating a plurality of predefined "what if" scenarios to determine an adequate scenario to improve the performance or operation of the one or more assets.

SUMMARY OF THE DISCLOSURE

According to at least one aspect, a system can include one or more processors and a memory storing computer code instructions. The computer code instructions, when executed by the one or more processors, cause the one or more processors to detect, using performance data of a computer environment, an event that occurred and that is indicative of abnormal performance of the computer environment. The one or more processors can identify, among a plurality of assets of the computer environment, a subset of assets associated with the event, and determine from a predefined set of resolutions a plurality of resolutions executable to address a cause of the event. The one or more processors can execute, for each resolution of the plurality of resolutions, a trained model to simulate the resolution for the subset of assets, and select, based at least on results of simulation of each resolution, a resolution among the plurality of resolutions to be implemented.

According to at least another aspect, a method can include detecting, by one or more processors, using performance data of a computer environment, an event that occurred and that is indicative of abnormal performance of the computer environment. The method can include identifying, by the one or more processors, among a plurality of assets of the computer environment, a subset of assets associated with the event. The method can include determining, by the one or more processors, from a predefined set of resolutions a plurality of resolutions executable to address a cause of the event. The method can include executing, by the one or more processors, for each resolution of the plurality of resolutions, a trained model to simulate the resolution for the subset of assets. The method can include selecting, by the one or more processors, based at least on results of simulation of each resolution, a resolution among the plurality of resolutions to be implemented.

According to at least another aspect, a computer-readable medium can include computer code instructions stored thereon. The computer code instructions when executed by one or more processors can cause the one or more processors to detect, using performance data of a computer environment, an event that occurred and that is indicative of abnormal performance of the computer environment. The one or more processors can identify, among a plurality of assets of the computer environment, a subset of assets associated with the event, and determine from a predefined set of resolutions a plurality of resolutions executable to address a cause of the event. The one or more processors can execute, for each resolution of the plurality of resolutions, a trained model to simulate the resolution for the subset of assets, and select, based at least on results of simulation of each resolution, a resolution among the plurality of resolutions to be implemented.

DETAILED DESCRIPTION

For purposes of reading the description of the various embodiments below, the following descriptions of the sections of the specification and their respective contents may be helpful:

Section A describes a computing and network environment which may be useful for practicing embodiments described herein.

Section B describes systems and methods for assessing and enhancing asset performance in a computer environment.

A. Computing and Network Environment

Figure 1A:
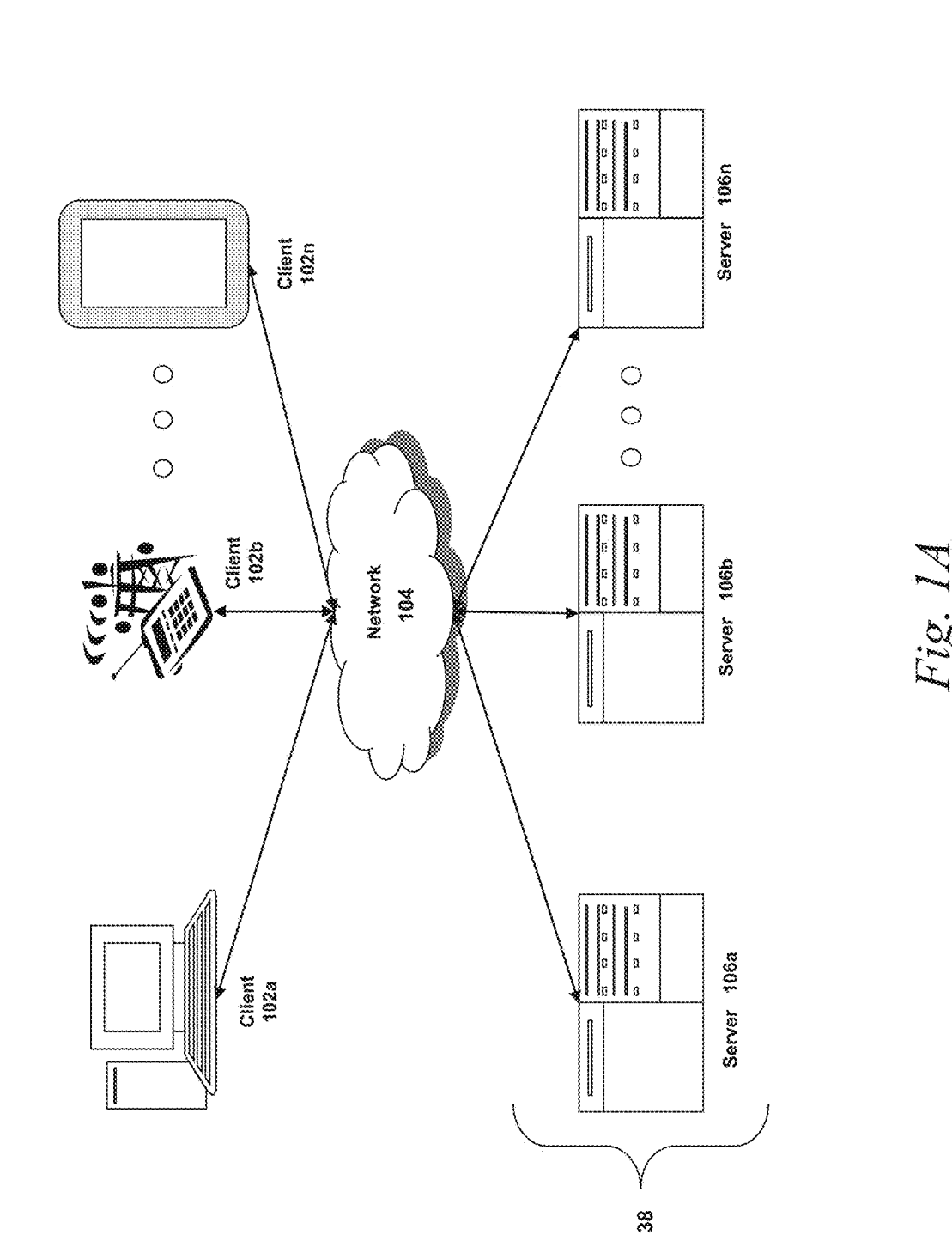
FIG. 1A is a block diagram depicting an embodiment of a network environment comprising local devices in communication with remote devices.

In addition to discussing specific embodiments of the present solution, it may be helpful to describe aspects of the operating environment as well as associated system components (e.g., hardware elements) in connection with the methods and systems described herein. Referring to FIG. 1A, an embodiment of a computing and network environment 10 is depicted. In brief overview, the computing and network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 1G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the computing and network environment 10 may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS 8 or 10, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, firewall, Internet of Things (IoT) controller. In one embodiment, the server 106 may be referred to as a remote machine or a node. In another embodiment, a plurality of nodes 290 may be in the path between any two communicating servers.

Figure 1B:
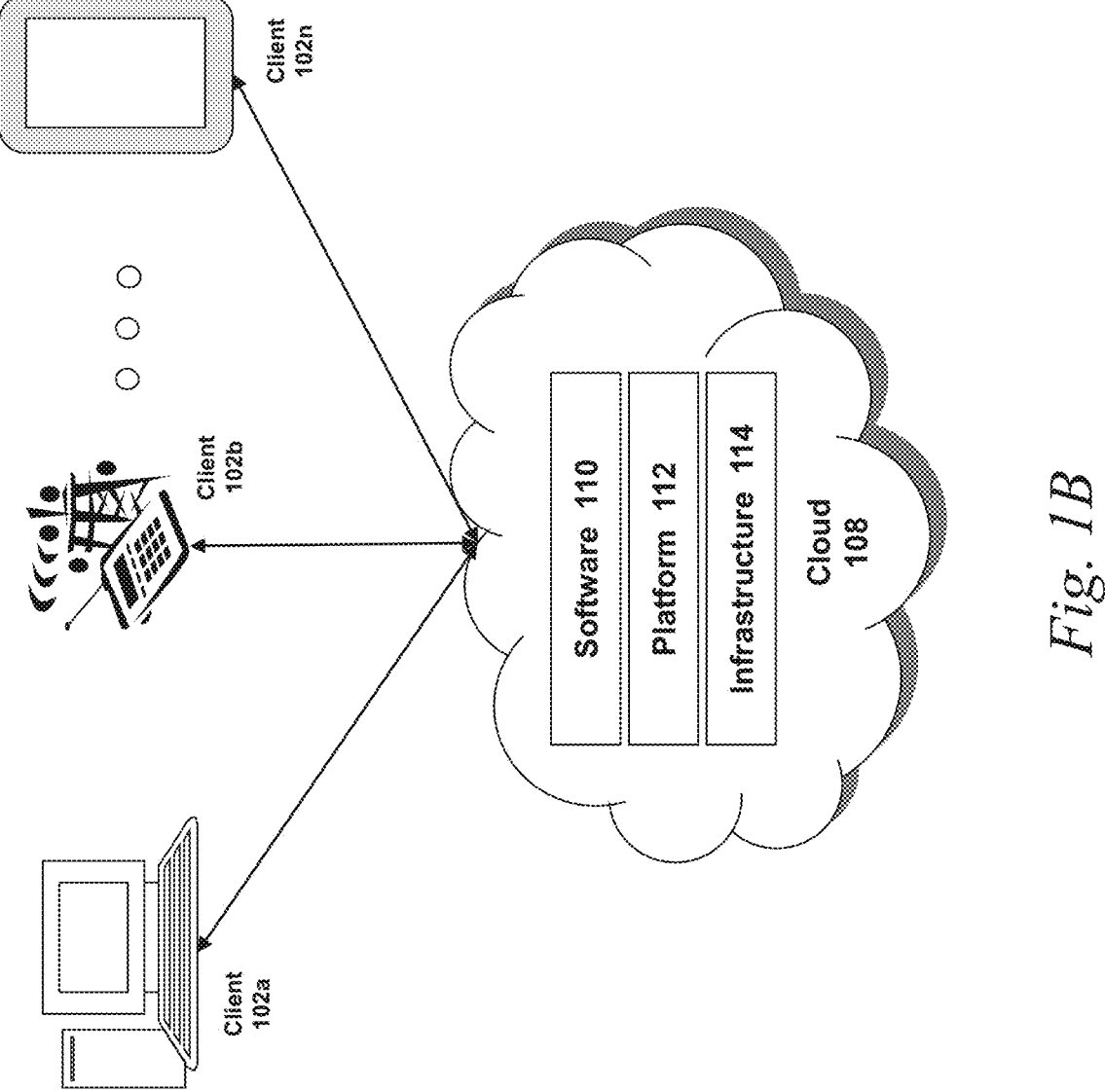
FIGS. 1B-1D are block diagrams depicting embodiments of computers useful in connection with the methods and systems described herein.

Referring to FIG. 1B, a cloud computing environment is depicted. The cloud computing environment can be part of the computing and network environment 10. A cloud computing environment may provide client 102 with one or more resources provided by the computing and network environment 10. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, for example, Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
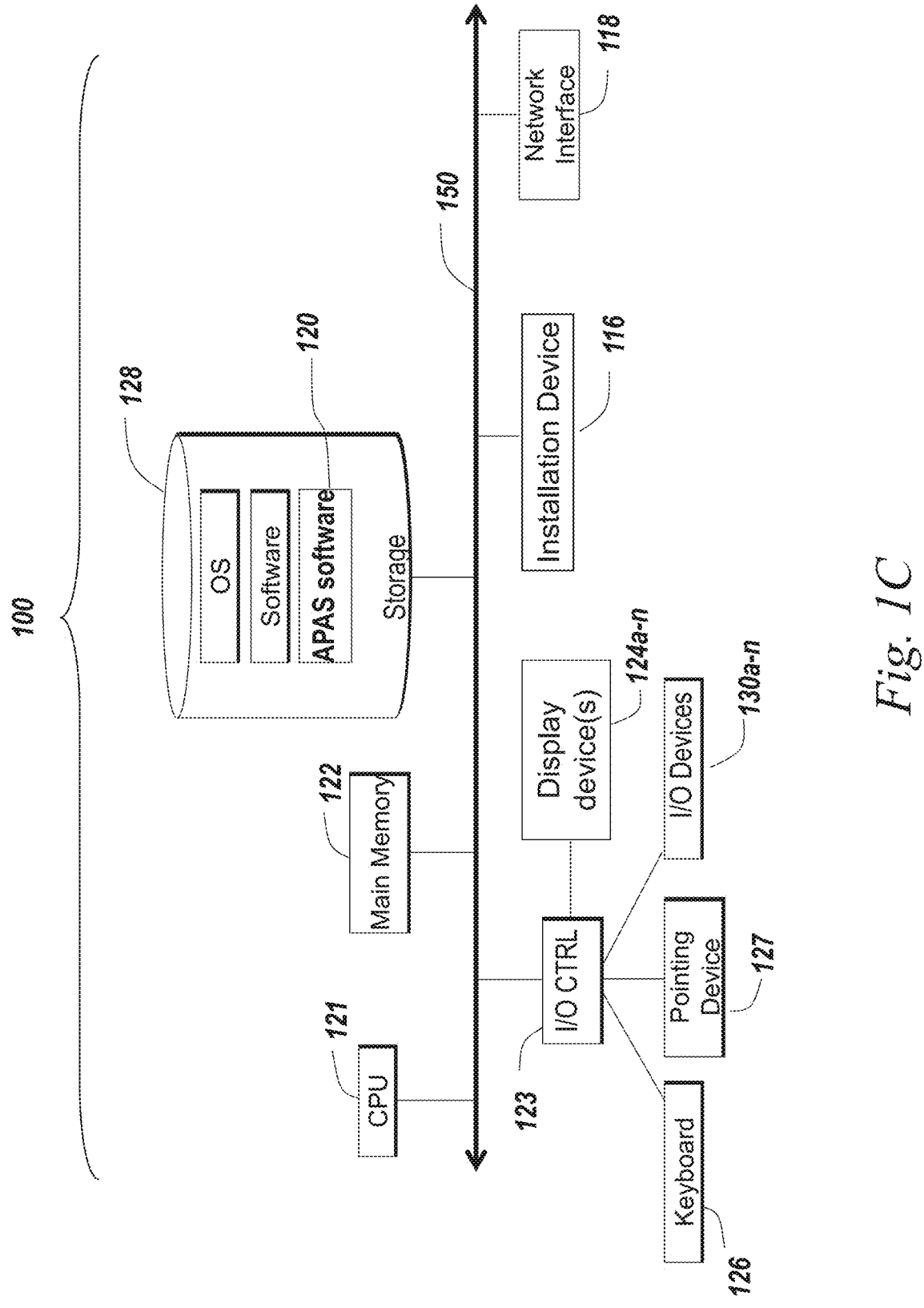
Figure 1D:
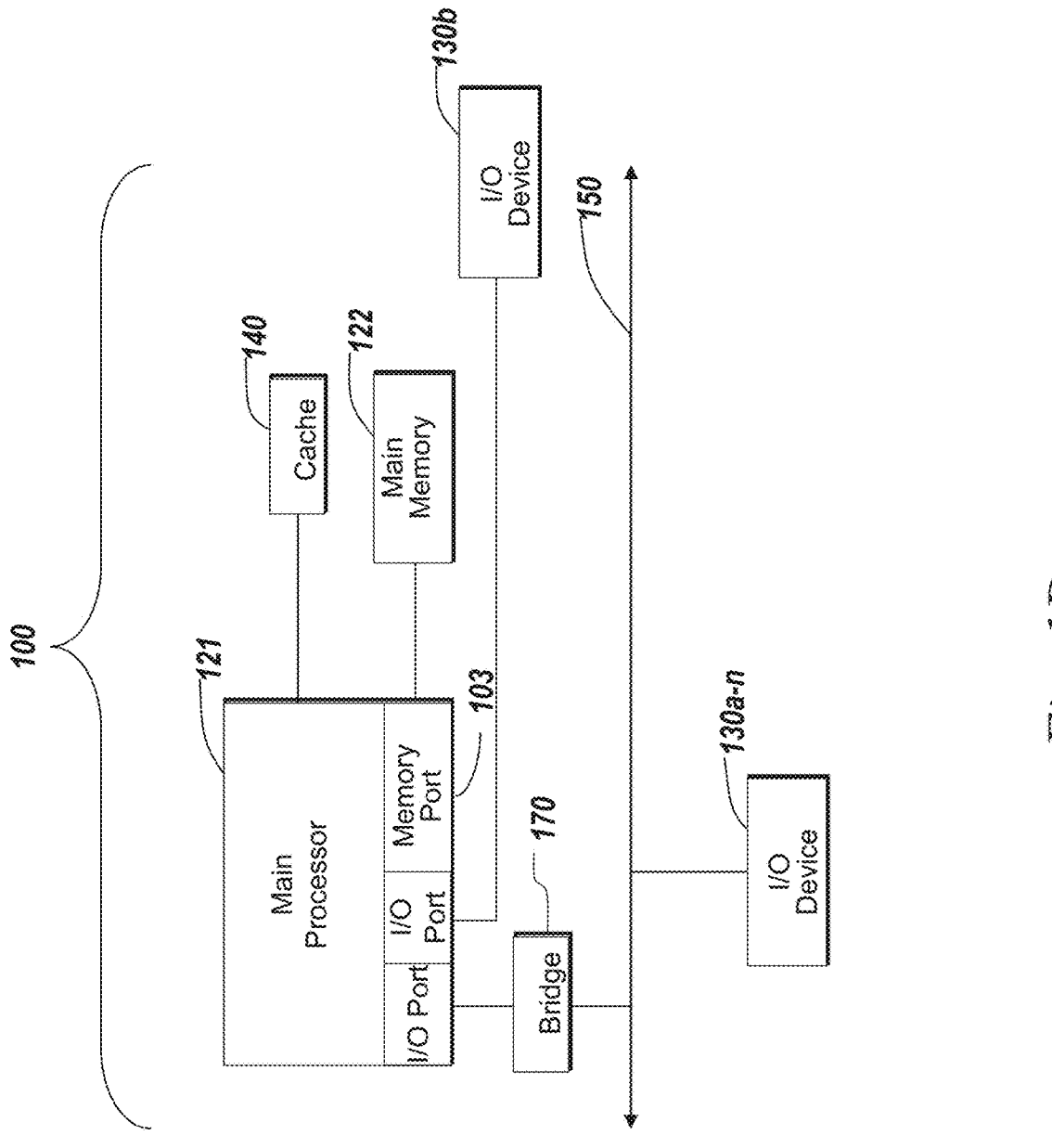

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, an asset-performance assessment system (APAS) software 120, and/or other software, among others. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferro-electric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANS-PORT, RAPIDIO, or INFINIBAND communications technology. FIG. 1D also depicts an embodiment in which local busses and direct communication are mixed: the processor

121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyro-scopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, pro-jected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film tran-sistor LCD (TFT-LCD), blue phase LCD, electronic papers (e-ink) displays, flexile displays, light emitting diode dis-plays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices $124a$-$124n$ may also be a head-mounted display (HMD). In some embodiments, display devices $124a$-$124n$ or the corresponding I/O controllers $123$ may be controlled through or have hardware support for OPENGL or DIRECTX API or other graphics libraries.

In some embodiments, the computing device $100$ may include or connect to multiple display devices $124a$-$124n$, which each may be of the same or different type and/or form. As such, any of the I/O devices $130a$-$130n$ and/or the I/O controller $123$ may include any type and/or form of suitable hardware, software, or combination of hardware and software to support, enable or provide for the connection and use of multiple display devices $124a$-$124n$ by the computing device $100$. For example, the computing device $100$ may include any type and/or form of video adapter, video card, driver, and/or library to interface, communicate, connect or otherwise use the display devices $124a$-$124n$. In one embodiment, a video adapter may include multiple connectors to interface to multiple display devices $124a$-$124n$. In other embodiments, the computing device $100$ may include multiple video adapters, with each video adapter connected to one or more of the display devices $124a$-$124n$. In some embodiments, any portion of the operating system of the computing device $100$ may be configured for using multiple displays $124a$-$124n$. In other embodiments, one or more of the display devices $124a$-$124n$ may be provided by one or more other computing devices $100a$ or $100b$ connected to the computing device $100$, via the network $104$. In some embodiments software may be designed and constructed to use another computer's display device as a second display device $124a$ for the computing device $100$. For example, in one embodiment, an Apple iPad may connect to a computing device $100$ and use the display of the device $100$ as an additional display screen that may be used as an extended desktop. One ordinarily skilled in the art will recognize and appreciate the various ways and embodiments that a computing device $100$ may be configured to have multiple display devices $124a$-$124n$.

Referring again to FIG. 1C, the computing device $100$ may comprise a storage device $128$ (e.g. one or more hard disk drives or redundant arrays of independent disks) for storing an operating system or other related software, and for storing application software programs such as any program related to the APAS software $120$. Examples of storage device $128$ include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device $128$ may be non-volatile, mutable, or read-only. Some storage device $128$ may be internal and connect to the computing device $100$ via a bus $150$. Some storage device $128$ may be external and connect to the computing device $100$ via a I/O device $130$ that provides an external bus. Some storage device $128$ may connect to the computing device $100$ via the network interface $118$ over a network $104$, including, e.g., the Remote Disk for MACBOOK AIR by Apple. Some client devices $100$ may not require a non-volatile storage device $128$ and may be thin clients or zero clients $102$. Some storage device $128$ may also be used as an installation device $116$, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device $100$ may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device $102$. An application distribution platform may include a repository of applications on a server $106$ or a cloud $108$, which the clients $102a$-$102n$ may access over a network $104$. An application distribution platform may include application developed and provided by various developers. A user of a client device $102$ may select, purchase and/or download an application via the application distribution platform.

Furthermore, the computing device $100$ may include a network interface $118$ to interface to the network $104$ through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device $100$ communicates with other computing devices $100'$ via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface $118$ may comprise a built-in network adapter, network interface card, PCMCIA network card, EXPRESSCARD network card, card bus network adapter, wireless network adapter, USB network adapter, modem or any other device suitable for interfacing the computing device $100$ to any type of network capable of communication and performing the operations described herein.

A computing device $100$ of the sort depicted in FIGS. 1B and 1C may operate under the control of an operating system, which controls scheduling of tasks and access to system resources. The computing device $100$ can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/ AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington. In other embodiments, the computing device 100 is a eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, central processing unit (CPU) and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Assessing and Enhancing Asset Performance

The present disclosure relates to systems and methods for assessing the performance or operational states of assets in computer environments, such as enterprise networks, cloud systems, banking systems, electric utility systems or networks of medical devices, among others, based on past performance data. The systems and methods described herein include simulating various scenarios for modifying architectural or configuration characteristics, among others, of the computer environment to improve respective performance.

Managing and monitoring computer environments usually involve monitoring the performance or operational states of various assets and/or subsystems of a computer environment. As used herein, assets of the computer environment can include hardware assets, software assets, data assets or a combination thereof. Hardware assets can include hardware devices such as computer hardware servers, desktops, laptops, mobile devices, tablet devices, electronic circuits, medical devices, electric devices, automated teller machines, camera devices, other electric or electromechanical devices among others or a combination thereof. Software assets can include virtual machines, micro virtual machines, operating systems, online applications, client applications, software programs, codes or scripts, software services, web page scripts, application programming interfaces (APIs) or a combination thereof. Data assets can include databases or data stored herein, data structures, data folders, data files, media files, web pages, authentication data, communication log files, access log files, other log files, configuration settings, security rules and/or files or a combination thereof, among others. Subsystems of the computer environment can include solutions or solution stacks, assets associated with a given site or a datacenter or other groups of assets, among others.

Monitoring and managing the performance or operational states of various assets of the computer environment can include monitoring CPU usage, memory usage, server response time, bandwidth usage, network performance parameters (e.g., latency, packet loss rate, round trip time (RTT), etc.), security performance data or parameters (e.g., denied connections, dropped traffic, etc.), asset or service accessibility or a combination thereof, among others. Monitoring such parameters allows for detecting abnormal, or less than acceptable, behavior performance by one or more assets or subsystems of the computer environment. Abnormal, or less than acceptable, performance can be due to many factors or reasons, such as cyber security breaches, increase in workload or network load, changes in architectural or configuration characteristics or settings, architectural flaws, misconfigurations or a combination thereof, among others.

Addressing any detected performance problem calls for the diagnosis of the root cause to determine the proper approach to fix the detected problem. However, the usually large number of assets in most computer environments and the typically complex dependencies between various assets make the diagnosis as well as the remedy difficult and nontrivial. For instance, an unusual increase in CPU usage could be due to a denial-of-service (DOS) attack, increase in workload, lack of redundancy or lack of load balancing, among others. Each of these causes calls for a different remedy. Similarly, a server (or other asset) can be down due to a denial-of-service (DOS) attack, a problem with a corresponding database, an overload of requests or a flapping port, among others.

Systems and methods described herein collect and record performance data for various assets and/or subsystems over time, and use the recorded data to detect a past event indicative of, for example, unsatisfactory or abnormal performance of one or more assets. The systems and methods can trigger simulation of a plurality of predefined remedial scenarios determined based on the detected past event, and select one of the scenarios to be implemented based on the simulation results.

Figure 2:
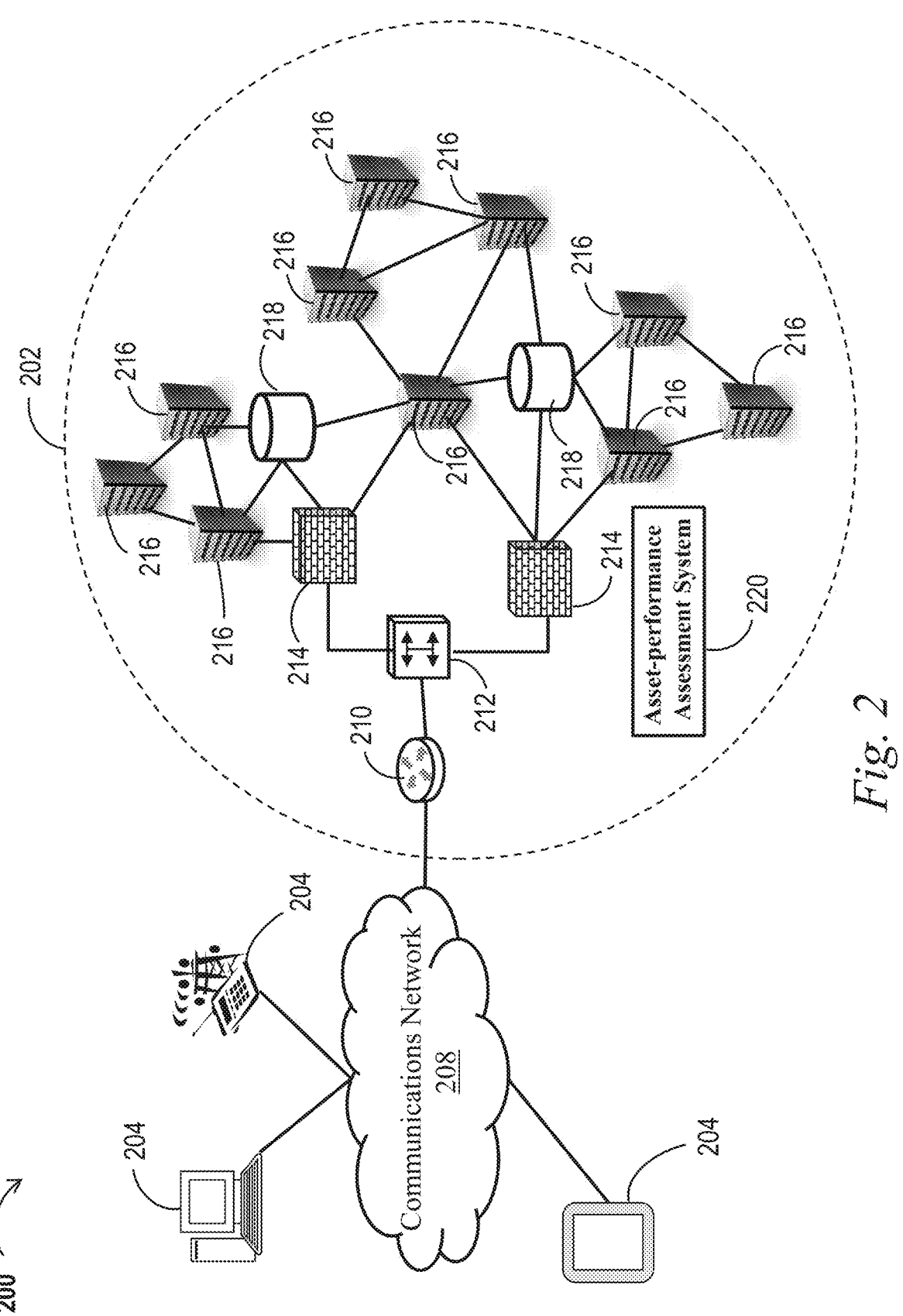
FIG. 2 is a block diagram illustrating an example network environment employing asset-performance assessment and simulation processes described herein, according to an example embodiment.

Referring to FIG. 2, a block diagram illustrating an example network environment 200 employing asset-performance assessment and simulation is shown, according to example embodiments. The network environment 200 can include a computer environment 202 and a plurality of communication devices 204. The computer environment 202 and the plurality of communication devices 204 can be communicatively coupled via a communications network 208. The communication network 208 can include a cellular network, a landline network, an optical network, a metropolitan area network (MAN), a wide area network (WAN), the Internet, a private network, a public network or a combination thereof, among others. The communication network 208 can be similar to the network 104 of FIG. 1A. The communication network 208 can be distributed over a plurality of geolocations, metropolitan areas or countries.

The communication devices 204 can include devices of the computer environment 202, such as client devices connecting remotely to the computer environment 202. The communication devices 204 can include client devices, such as the client devices 102 of FIGS. 1A and 1B. For instance, the communication devices 204 can include a smart phone, a tablet device, a mart watch, other handheld device, a laptop, a desktop, a medical device with communication capability, an automated teller machine (ATM), a circuit device, a sensor device, a camera device, a sensor device, a drone, other device with communication capabilities or a combination thereof, among others. The communication devices 204 can be configured to send data to, or access data from, the computer environment 202 via the communication network 208. The computer environment 202 can be arranged in one or more geolocations or sites, and the communication devices 204 can include a device (e.g., a wireless device or an ATM) of the computer environment 202 that is located remotely from the one or more sites. The communication devices 204 can include one or more devices, such as a laptops, desktops, smart phones, handheld devices or computer servers that are not part of the communication environment 202 but are accessing one or more resources of the computer environment 202.

The computer environment 202 can include an enterprise computer network, a cloud network or system, a banking computer system, a power grid system, a network of medical devices, a social network, a communications network (e.g., wireless communications network), a media streaming system or network, a security monitoring system or a combination thereof, among others. The computer environment 202 can include any combination of communicatively connected electronic devices, electrical devices and/or electromechanical devices. The computer environment 202 can be distributed over, or can include, a plurality of sites associated with distinct geolocations. The computer environment 202 can include one or more solution stacks or solutions. The computer environment 202 can include one or more network devices, such as router 210, network switch 212, a modem device, a wireless router or a combination thereof. The computer environment 202 can include one or more firewall devices (or systems) 214, a plurality of computer servers 216, one or more databases 218, and an asset performance assessment (APA) system 220. The computer environment 202 can include one or more other computing devices, electronic devices, electromechanical devices, or other devices of other type. The computer environment 202 can include software assets, such as software applications, software programs and/or software platforms. The computer environment 202 can include data assets, such as data folders, data files, data structures or a combination thereof.

The computer servers 216, the databases 218, the network devices and/or the other devices of the computer environment 202 can be communicatively coupled to each other. In general, various devices of the computer environment 202 can be dependent on each other. The interdependencies can include data dependency, software dependency, storage dependency, communication dependency, security dependency or a combination thereof, among other dependencies.

The network devices can manage communication channels within the computer environment 202 as well as communication channels with external devices. The network devices can collect network performance data, such as data indicative of bandwidth usage, packet drop rate, number or rate of out of order packets, transport control protocol (TCP) retransmits, latency or a combination thereof among others. In some implementations, one or more network devices or a network database can maintain the collected network performance data. The collected network performance data can include information related to measured network performance parameters such as time (e.g., timestamps), traffic destination, traffic source, communication link, communication session identifier or a combination thereof, among others.

Each firewall device 214 can maintain a corresponding defined set of security rules. A system administrator of the computer environment 202 or the asset-performance assessment (APA) system 220 can manage the defined set of security rules for each firewall device 214. The firewall device(s) 214 can monitor incoming and/or outgoing network traffic, and decide whether to allow or block specific traffic based on the corresponding set of security rules. The firewall device(s) 214 can also collect data related to security of incoming and/or outgoing network traffic over time. The firewall device(s) 214 or a security database can store the collected security data. The collected security data can include, for example, logs of blocked and/or allowed network traffic, reasons (e.g., invoked security rule) for blocking network traffic, requesting entity and/or source of blocked network traffic or a combination thereof, among others.

The computer servers 216 can include one or more email servers, one or more application servers, one or more client servers, one or more file transfer protocol (FTP) servers, one or more web servers, one or more SQL servers, one or more MICROSOFT EXCHANGE servers, one or more communication servers, one or more authentication servers or a combination thereof, among others. The authentication server(s) can maintain data indicative of successful and/or failed authentications including, for example, a device identifier, a time stamp and/or used login identifier for each authentication or authentication attempt. The application server(s) can maintain data (e.g., session logs) indicative of past and/or current user sessions. For each user session, the application server(s) can store session timing information (e.g., start, end and/or duration), user identification of user initiating the session, device identifier of of communication device 204 initiating or participating in the sessions, data exchanged during the session, activities or tasks performed during the session or a combination thereof. The One or more servers 216 or resources thereof can be accessible by the communication devices 204. Each of the computer servers 216 can be accessible via the firewall(s) 214. In some implementations, one or more computer servers 214 may not be arranged behind the firewall(s) 214.

The database(s) 218 can be maintained by one or more computer servers 216 or one or more storage devices. The database(s) 216 and/or the computer server(s) can be located in a site of the computer environment 202 or a data center hosting some services associated with the computer environment 202. The database(s) 218 can store user authentication data, other user data, application data, web pages, services data, business data, research and development data, marketing data, human resources data or a combination thereof, among others. The data stored by the database(s) 218 can be used by the computer servers 216, or can be accessible by the communication devices 204. The database(s) 218 can store data with different sensitivity or importance. For instance, different access rights can be associated with distinct data sets. The access rights for each data set can be assigned to one or more users or communication devices 204 based on, for example, user profiles, defined firewall security rules, relevance of the data set to various tasks or projects, importance of the data set or a combination thereof.

The asset-performance assessment (APA) system 220 can detect a past events, e.g., indicative of unsatisfactory performance of one or more assets of the computer environment 202, based on recorded historical performance data. In response, the APA system 220 can initiate or launch simulations of a various remedial scenarios selected from a plurality of predefined remedial scenarios based on the detected past event. The APA system 220 can then select, based on the simulation results, one of the simulated scenarios to be implemented or to be proposed for implementation. The APA system 220 can be implemented as software, firmware, hardware or a combination thereof. The APA system 220 can be communicatively coupled to one or more network devices, such as router 210 and switch 212, firewall devices 214, computer servers 216, databases 218, communication devices 204, other devices associated with the computer environment 202 or a combination thereof. The APA system 220 is discussed in further detail below with regard to FIGS. 3-5.

Figure 3:
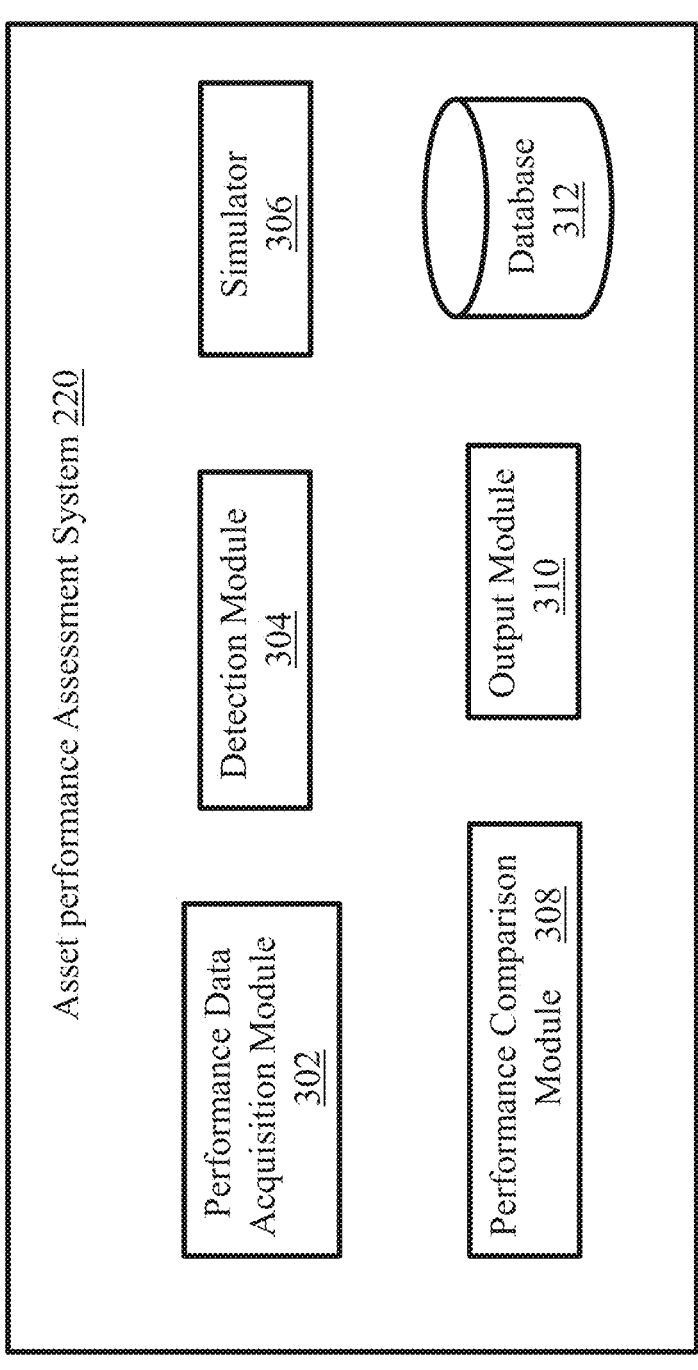
FIG. 3 shows an example block diagram of an asset-performance assessment system, according to an example embodiment.

Referring to FIG. 3, an example block diagram of the asset asset-performance assessing (APA) system 220 is shown, according to an example embodiment. In brief overview, the APA system 220 can include a performance data acquisition module 302, a detection module 304, a database 304, a simulator 306, a performance comparison module 308, an output module 310 and a database 312. Each of the modules (or components) of the APA system 220 can be implemented as a hardware module, a software module, a firmware module, or a combination thereof. For instance, the asset-performance assessing system 220 can include one or more processors such as processor 121 of FIGS. 1C and 1D and a memory such as the main memory 122 or the cache memory 140. The memory can store computer code instructions, which when executed by the one or more processors can cause the one or more processors to perform methods described herein (e.g., method 400 of FIG. 4) or steps thereof associated with the asset-performance assessing system 220. The functionalities of each of the modules of the APA system 220 are discussed in further detail below with regard to FIGS. 4 and 5.

Figure 4:
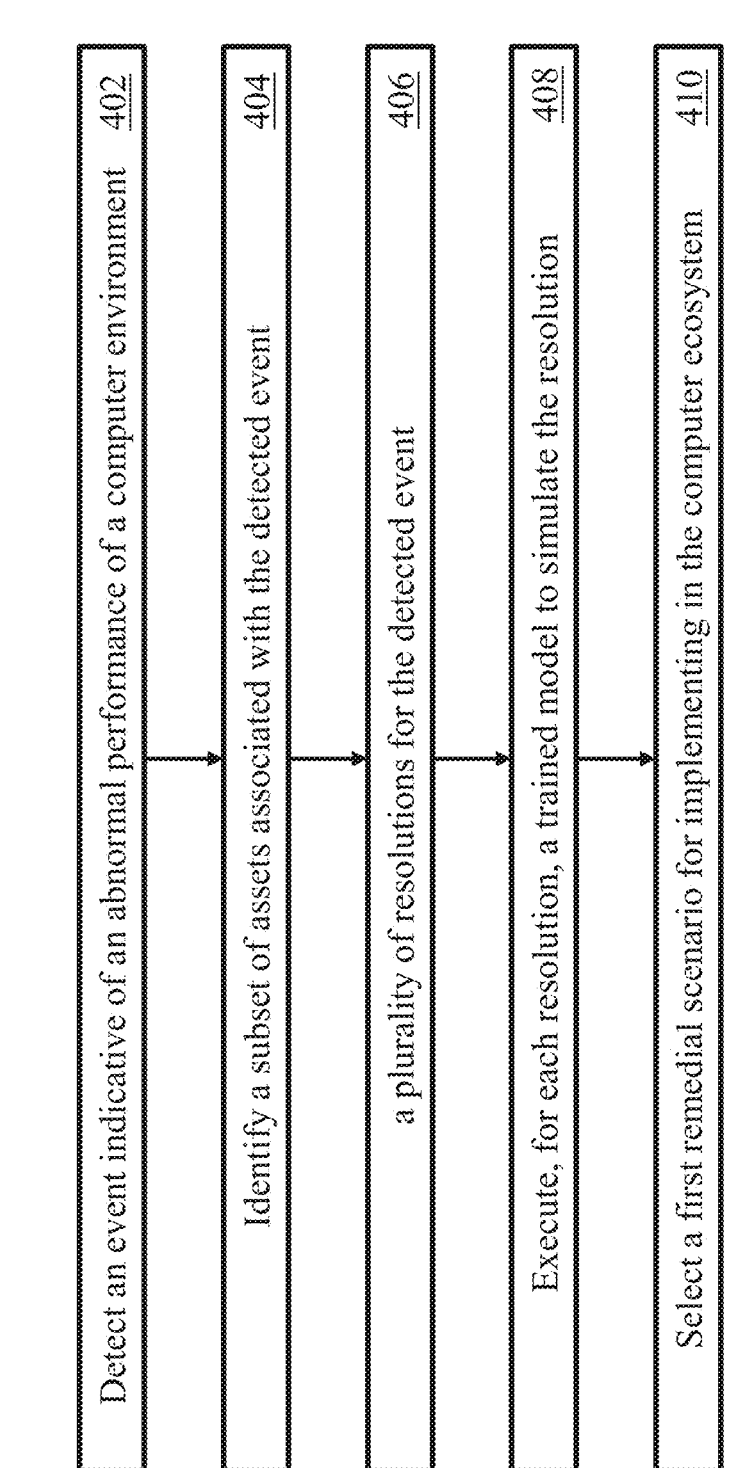
FIG. 4 shows a flowchart illustrating a method for assessing and simulating asset performance, according to an example embodiment.

FIG. 4 shows a flowchart illustrating a method 400 for asset-performance assessment and simulation in a computer environment, according to an example embodiment. In a brief overview, the method 400 can include the APA system 220 detecting an event that occurred (or that occurs) and that is indicative of abnormal performance of the computer environment 202 (STEP 402), and identifying a subset of assets of the computer environment 202 associated with the event (STEP 404). The method 400 can include the APA system 220 determining, from a predefined set of resolutions (or remedies), a plurality of resolutions or remedies executable to address a cause of the event (STEP 406). The method 400 can include the APS system 220 executing, for each resolution, a trained model to simulate the resolution for the subset of assets (STEP 408). The method 400 can include the APA system 220 selecting, based at least on results of simulations of the plurality of resolutions, a resolution among the plurality of resolutions to be implemented (STEP 410).

The resolutions or remedies can be viewed as possible modifications of the computer environment 202. In other words, the APA system 220 can determine, from a predefined set of modifications to the computer environment, a plurality of modifications that can be executed or implemented to eliminate, or alleviate the effect of, the cause of the detected event. The modifications can include modifications to the architecture of the computer environment 202 and/or modifications to configuration parameters of assets of the computer environment 202, among others.

Referring to FIGS. 3 and 4, the method 400 can include the detection module 302 detecting the past event of the computer environment 202 (STEP 402). The performance data can include one or more parameters indicative of an amount of usage of computational resources, one or more parameters indicative of an amount of usage of memory resources, one or more parameters indicative of an amount of usage of network resources, and/or indications of states (e.g., availability state) of the plurality of assets of the computer environment. The detection module 304 can access past performance data of various assets and/or subsystems of the computer environment 202. The database 312 can store the past performance data for the various assets and/or subsystems. In some implementations, the performance-data acquisition module 302 can collect or acquire performance data from various assets and/or subsystems of the computer environment 202.

For instance, the performance-data acquisition module 302 can receive from the network devices, such as router 210 or switch 212, (or network database) network performance data, such as bandwidth usage, throughput, latency, packet loss, retransmissions, connectivity and/or availability, among others. The performance-data acquisition module 302 can receive from the firewall devices 214 (or a database thereof) logs data indicative of blocked and/or allowed network traffic, reasons (e.g., invoked security rule) for blocking network traffic, entities requesting blocked or allowed network traffic, or a combination thereof, among others. The performance-data acquisition module 302 can receive from the servers 216 data indicative of server CPU usage, server memory usage, server bandwidth usage, number of applications running thereon, application performance data (e.g., application running speed, number of ongoing sessions, etc.), corresponding log files (e.g., communication logs, application and/or software logs, error logs, etc.) or a combination thereof. The performance-data acquisition module 302 can receive from the databases 218 indications of data stored thereon, accessed data and/or accessing entities, database bandwidth usage, database memory or storage usage, database usage of computing resources or a combination thereof. The performance-data acquisition module 302 can receive data indicative of results of antivirus scans and/or network scans.

The performance-data acquisition module 302 can acquire performance data on a regular basis. The performance-data acquisition module 302 can store the acquired performance data in the database 312. In some implementations, instead of storing raw performance data, the performance-data acquisition module 302 can compute and store statistical parameters of the acquired performance data. For instance, instead of storing actual values of CPU usage, memory usage or bandwidth usage, the performance-data acquisition module 302 can determine and store the corresponding mean (and/or standard deviation) values computed over predefined time durations. Using statistical parameters instead of actual raw data can reduce the amount of data to be stored significantly. The performance-data acquisition module 302 can store each piece of performance data in association with a corresponding time stamp or time value indicative of a time instance at which the piece of data was generated. In some implementations, the acquisition and maintenance of the performance data can be performed by some other assets of the computer environment 202.

The detection module 304 can access and examine past performance data recorded in the database 312. For instance, the detection module 304 can examine recorded performance data associated with a past time period. The detection module 304 can detect the event upon determining that a performance parameter of the computer environment 202 or an asset thereof exceeds a predefined threshold value over at least a predefined time duration. The detection module 304 can compare some records of past performance data, such as CPU usage, memory usage, bandwidth usage, packet loss rate, RTT and/or latency, to corresponding threshold values. The detection module 304 can detect a past event based on such comparison. For example, the detection module 304 can detect a past event upon determining that a performance parameter (e.g., CPU usage, memory usage, bandwidth usage, packet loss rate, RTT and/or latency) exceeds a predefined threshold over at least a predefined time duration. In some implementations, the detection module 304 can detect a past event upon detecting a past asset state, e.g., asset is down or non-responsive. In some implementations, the detection module 304 can detect a past event upon determining that one or more predefined conditions are satisfied when applied to at least a portion of the recorded performance data. In some implementations, the detection module 304 can detect the event upon detecting one or more predefined states for one or more assets of the computer environment 202, such as a non-available state, a down state or a non-responding state.

The method 400 can include the detection module 304 identifying a subset of assets of the computer environment 202 associated with the detected event. The detection module 304 can identify, using the recorded past performance data, assets that are directly affected by the event. For example, the detection module 304 can identify all assets associated with abnormal or unsatisfactory performance parameters, such as unavailability, relatively high bandwidth usage, relatively high CPU usage, relatively high memory usage, relatively high packet loss, relatively high retransmission rate or a combination thereof. The detection module 304 can identify assets that have a dependency relationship with the assets that are directly affected by the event to be included in the subset. The detection module 304 may also identify other assets that belong to the same solution (solution stack) as the directly affected assets, and/or other assets having connections or a dependency relationship with the directly affected assets. The detection module 304 may identify other assets that are of similar type, have similar operating systems or have similar description or functionality as the directly affected assets. In some implementations, the detection module 304 can maintain indications of a plurality of predefined subsets of assets (e.g., solutions or solution stacks, servers or devices associated with a given operating system or a given service, etc.) of the computer environment 202. Upon determining that a asset belonging to a predefined subset is affected by the past event, the detection module 304 can identify the whole predefined subset.

The method 400 can include the simulator 306 determining from a predefined set of resolutions (also referred to as remedial scenarios or modifications to the computer environment 202) a plurality of resolutions executable to address the cause of the event (STEP 406), and executing, for each resolution of the plurality of resolutions, a trained model to simulate the resolution for the subset of assets (STEP 408). The database 304 can maintain one or more data structures, e.g., lookup tables, trees, linked lists, etc., storing a list of predefined resolutions to various events or event types. The possible remedial (or "what if") scenarios can include adding redundancy for one or more assets (e.g., of the subset of assets or of the computer environment), adding more storage resources to the computer environment 202 or the subset of assets (e.g., adding storage devices), adding a load balancer, adding more computing resources to the computer environment 202 or the subset of assets, increasing communication bandwidth, removing or modifying one or more security rules of firewall 214, re-routing data traffic, modifying the architecture of the subset of assets or of the computer environment 202, or changing configuration settings or parameters of one or more assets of the subset of assets (or of the computer environment 202), among others. The one or more data structures can store each predefined resolutions or remedial scenarios in association with one or more corresponding events or in association with an event type. The one or more corresponding events or the event type can represent events or an event type that would trigger simulation of the resolution or the remedial scenario. For instance, the simulator 306 can determine the plurality of resolutions based on a type of the event.

The APA system 220 or the database 312 can maintain a plurality of trained modules. The APA system 220 (or other computer system) can train one or more models of assets, solutions or solution stacks and/or other subsystems of the computer environment 202. The data used to train the models can include CPU usage data, memory usage data, bandwidth usage data, availability data, packet loss data and/or retransmission rate data, among others. The trained models can be designed to mimic the operations of various assets or subsystems of the computer environment 202 under different conditions. The trained models can include statistical models, neural networks or other artificial intelligence (AI) models. The database 312 can store or maintain implementations of the trained models, which can be accessible by the simulator 306.

Figure 5:
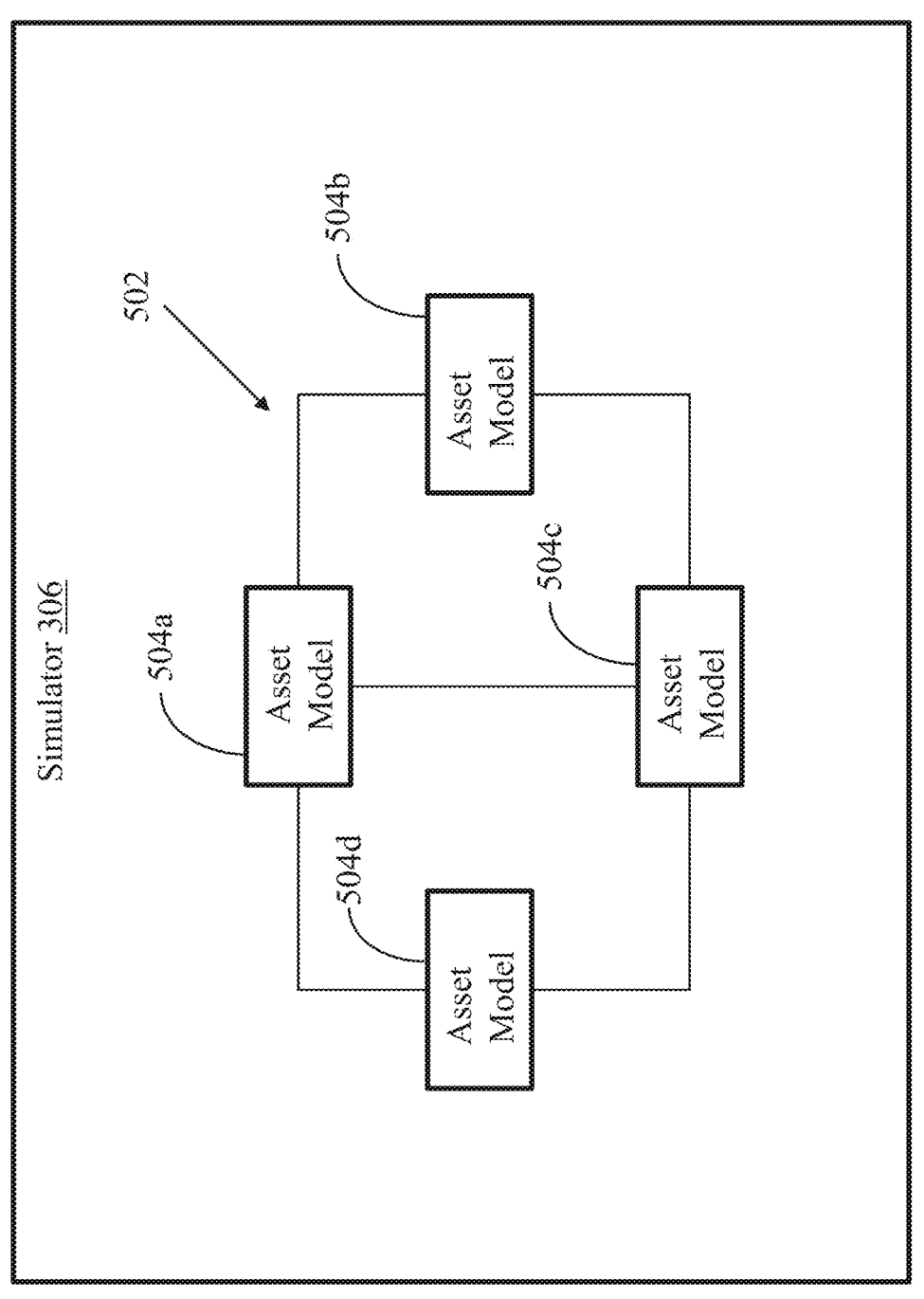
FIG. 5 shows an example block diagram of a simulator, according to an example embodiment.

Referring to FIG. 5, a block diagram illustrating an example implementation of the simulator 306 is shown, according to an example embodiment. The simulator 306 can retrieve a trained model 502 of a subsystem (e.g., solution stack) of the computer environment 202 from the database 304, and execute the trained model 502. The trained model 502 can include a plurality of asset models, such as asset models 504a-504d referred to herein individually or collectively as asset model(s) 504. Each asset model 504 can represent trained model of a corresponding asset of the identified subset of assets. In the trained model 502, the asset models 504 can be connected, or in some relationship, in way that reflects the actual architecture of the computer subsystem (e.g., solution stack) represented by the trained model 502.

The simulator 306 can select or determine a plurality of resolutions or remedial scenarios from a predefined set of resolutions (or a predefined set of remedial scenarios) maintained by the one or more data structures. The simulator 306 can select or determine the plurality of resolutions or remedial scenarios based on a type or characteristics of the past event detected at STEP 402. The simulator 306 can execute various versions of the trained model 502 corresponding to the set of resolutions determined at STEP 406. For instance, a first version of the trained model 502 can include one or more new added assets to introduce or increase redundancy, a second version of the trained model 502 can include modifications to configuration settings of one or more assets, while a third version can include added, removed or modified security rules of the firewall devices 214. In general, each version of the trained model 502 can be associated with, or represent, a corresponding remedial scenario.

The simulator 306 can feed input data to the various versions of the trained model 502 being simulated consistent with input data that led to the past performance data recorded in the database 312. That is the simulator 306 can execute each trained model with similar traffic load or similar processing load as a traffic load or a processing load of the subset of assets at the time of the event. For instance, the traffic data, amount of queries to be processed, ongoing sessions and/or running applications for the simulated versions of the trained model 502 can be similar to those associated with the computer subsystem at the time period corresponding to the historical data based on which the past event was detected. Also, the asset models 504 can have similar configurations or settings as the corresponding assets of the computer environment 202 at the time period corresponding to the historical or past data. As such, the simulated versions of the trained model 502 can follow as closely as possible the actual time-varying reality of the corresponding computer subsystem.

Launching or executing the simulations of the various versions of the trained model 502 can include the output module 310 rendering or displaying a simulation window for each of the simulations. Each display window can show output parameters (e.g., availability, CPU usage, memory usage, bandwidth usage, number of malware replicas, amount of encrypted data by malware or amount of data revealed to or stolen by attacker, among others) of the corresponding simulated version of the trained model 502. The performance comparison module 308 can compare the output of each simulated version of the trained model 502 to corresponding performance data recorded in the database 312. In some implementations, the output module 310 can cause a display window to disappear when the corresponding simulated remedial scenario fails. In other words, the output module 310 can keep displaying each simulation window as long as the corresponding simulated remedial scenario did not reach a corresponding fail state. At the end, only display/simulation windows for successfully simulated remedial scenarios will persist on a screen device of the APA system 220. The performance comparison module 308 can determine failure of a simulated remedial scenario based on the comparison of the output of the corresponding simulated version of the trained model 502 to corresponding past performance data recorded in the database 312.

The rendering of the simulation windows for the various simulated resolutions allows a user of the APA system 220 to follow the simulation progress for each of the simulated remedial scenarios. The output module 310 can present the cause or type of failure for each failing simulation. The output module 310 can present the simulation windows as part of a UI. The UI can include interactive icons to allow a user to request additional information about the failing or successful simulations. The output module 310 can present the additional information, responsive to user request.

The method 400 can include the output module 310 selecting, based at least on results of simulation of each resolution, a resolution among the plurality of resolutions to be implemented in the computer environment 202 (STEP 410). The output module 310 can provide details for implementing a successfully simulated resolution or remedial scenario as output, e.g., for display on a display device. The implementation of the selected resolution or remedial scenario can be carried out by an administrator or an IT personnel of the computer environment 202. In some implementations, the output module 310 can automatically implement the selected resolution, e.g., upon receiving a confirmation from a user (e.g., IT administrator) to implement. For example, if the resolution represents a modifying a configuration parameter, the output module 310 can ask the user whether to automatically implement the selected resolution. Upon receiving a confirmation to modify or update the configuration parameter, the output module 310 can update the parameter.

The methods, e.g., method 400, described in this disclosure can be carried out by computer code instructions stored on a computer-readable medium. The computer code instructions, when executed by one or more processors of one or more computing device, can cause the computing device to perform the method(s) described herein.

While the disclosure has been particularly shown and described with reference to specific embodiments, it should be understood by those skilled in the art that various changes in form and detail may be made therein without departing from the spirit and scope of the invention described in this disclosure.

While this disclosure contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

What is claimed is:

1. A system comprising:

one or more processors; and a memory storing computer code instructions, the computer code instructions, when executed by the one or more processors, cause the one or more processors to:

detect, using performance data of a computer environment, an event that occurred and that is indicative of abnormal performance of the computer environment;

identify, among a plurality of assets of the computer environment, a subset of assets associated with the event;

select, based on a type of the event, from a predefined set of resolutions stored in one or more data structures, a plurality of resolutions executable to address a cause of the event;

retrieve, from a database, for each resolution of the plurality of resolutions, a version of a trained model, of a plurality of versions of the trained model, of at least a subsystem of the computer environment corresponding to each resolution, each version of the trained model including a plurality of asset models corresponding to the subset of assets associated with the event, each version of the trained model comprising a neural network trained with past performance data and configured to represent a corresponding resolution of the plurality of resolutions, each corresponding resolution comprising one or more modifications to one or more configuration parameters of one or more of the subset of assets different from one or more modifications of another resolution;

execute a simulation, for each resolution of the plurality of resolutions, using each version of the trained model to simulate each resolution for the subset of assets, the one or more processors providing as input, to each version of the trained model, a traffic load corresponding to a traffic at a time of the event; and select, based at least on results of simulation of each resolution using each version of the trained model, a resolution among the plurality of resolutions that did not reach a fail state.

2. The system of claim 1, wherein the one or more processors are further configured to implement the selected resolution within the computer environment.

3. The system of claim 1, wherein the one or more processors are further configured to provide information related to implementation of the selected resolution for display on a display device.

4. The system of claim 1, wherein the one or more processors are configured to detect the event upon determining that a performance parameter of the computer environment exceeds a predefined threshold value over at least a predefined time duration.

5. The system of claim 1, wherein the one or more processors are configured to detect the event upon detecting one or more predefined states for one or more assets of the computer environment.

6. The system of claim 1, wherein the plurality of resolutions can include at least one of:

increasing redundancy for one or more assets of the subset of assets;

adding a load balancer to the computer environment;

adding more storage resources to the computer environment;

adding more computing resources to the computer environment;

modifying an architecture of the subset of assets; or modifying a configuration parameter of one or more assets of the computer environment.

7. The system of claim 1, wherein the one or more processors are configured to select the plurality of resolutions based on the type of the event.

8. The system of claim 1, wherein the one or more processors are configured to provide as input to execution of the trained model a processing load corresponding to a processing load of the subset of assets at the time of the event.

9. The system of claim 1, wherein the one or more processors are further configured to display a simulation window for executing the trained model, the simulation window depicting simulation progress of the resolution corresponding to the executing trained model.

10. The system of claim 1, wherein the performance data of the computer environment includes at least one of:

one or more parameters indicative of an amount of usage of computational resources;

one or more parameters indicative of an amount of usage of memory resources;

one or more parameters indicative of an amount of usage of network resources; or indications of states of the plurality of assets of the computer environment.

11. A method comprising:

detecting, by one or more processors, using performance data of a computer environment, an event that occurred and that is indicative of abnormal performance of the computer environment;

identifying, by the one or more processors, among a plurality of assets of the computer environment, a subset of assets associated with the event;

selecting, by the one or more processors based on a type of the event, from a predefined set of resolutions stored in one or more data structures, a plurality of resolutions executable to address a cause of the event;

retrieving, by the one or more processors, from a database, for each resolution of the plurality of resolutions, a version of a trained model, of a plurality of versions of the trained model, of at least a subsystem of the computer environment corresponding to each resolution, each version of the trained model including a plurality of asset models corresponding to the subset of assets associated with the event, each version of the trained model comprising a neural network trained with past performance data and configured to represent a corresponding resolution of the plurality of resolutions, each corresponding resolution comprising one or more modifications to one or more configuration parameters of one or more of the subset of assets different from one or more modifications of another resolution;

executing, by the one or more processors, a simulation for each resolution of the plurality of resolutions, using each version of the trained model to simulate each resolution for the subset of assets, the one or more processors providing as input, to each version of the trained model, a traffic load corresponding to a traffic at a time of the event; and selecting, by the one or more processors, based at least on results of simulation of each resolution using each version of the trained model, a resolution among the plurality of resolutions that did not reach a fail state.

12. The method of claim 11, further comprising at least one of:

implementing the selected resolution within the computer environment; or providing information related to implementation of the selected resolution for display on a display device.

13. The method of claim 11, comprising detecting the event upon determining that a performance parameter of the computer environment exceeds a predefined threshold value over at least a predefined time duration.

14. The method of claim 11, comprising detecting the event upon detecting one or more predefined states for one or more assets of the computer environment.

15. The method of claim 11, wherein the plurality of resolutions can include at least one of:

increasing redundancy for one or more assets of the subset of assets;

adding a load balancer to the computer environment;

adding more storage resources to the computer environment;

adding more computing resources to the computer environment;

modifying an architecture of the subset of assets; or modifying a configuration parameter of one or more assets of the computer environment.

16. The method of claim 11, comprising selecting the plurality of resolutions based on the type of the event.

17. The method of claim 11, wherein executing the trained model to simulate the plurality of resolutions for the subset of assets includes providing as input to executing the trained model a processing load corresponding to a processing load of the subset of assets at the time of the event.

18. The method of claim 11, wherein the one or more processors are further configured to display a simulation window for executing trained model, the simulation window depicting simulation progress of the resolution corresponding to the executing trained model.

19. The method of claim 11, wherein the performance data of the computer environment includes at least one of:

one or more parameters indicative of an amount of usage of computational resources;

one or more parameters indicative of an amount of usage of memory resources;

one or more parameters indicative of an amount of usage of network resources; or indications of states of the plurality of assets of the computer environment.

20. A non-transitory computer-readable medium storing computer executable instructions, the computer executable instructions when executed by one or more processors cause the one or more processors to:

detect, using performance data of a computer environment, an event that occurred and that is indicative of abnormal performance of the computer environment;

identify, among a plurality of assets of the computer environment, a subset of assets associated with the event;

select, based on a type of the event, from a predefined set of resolutions stored in one or more data structures, a plurality of resolutions executable to address a cause of the event;

retrieve, from a database, for each resolution of the plurality of resolutions, a version of a trained model, of a plurality of versions of the trained model, of at least a subsystem of the computer environment corresponding to each resolution, each version of the trained model including a plurality of asset models corresponding to the subset of assets associated with the event, each version of the trained model comprising a neural network trained with past performance data and configured to represent a corresponding resolution of the plurality of resolutions, each corresponding resolution comprising one or more modifications to one or more configuration parameters of one or more of the subset of assets different from one or more modifications of another resolution;

execute a simulation, for each resolution of the plurality of resolutions, using each version of the trained model to simulate the each resolution for the subset of assets, the one or more processors providing as input, to each version of the trained model, a traffic load corresponding to a traffic at a time of the event; and select, based at least on results of simulation of each resolution using each version of the trained model, a resolution among the plurality of resolutions that did not reach a fail state.

* * * * *